United States Patent [19]
Beaufoy et al.

[11] Patent Number: 5,013,333
[45] Date of Patent: May 7, 1991

[54] UNATTENDED AIR CLEANING SYSTEM FOR SURFACE MAINTENANCE MACHINE

[75] Inventors: Jeffrey J. Beaufoy, Prior Lake; Robert C. Aigner, Ham Lake; Steven A. Burke, Champlin, all of Minn.

[73] Assignee: Tennant Company, Minneapolis, Minn.

[21] Appl. No.: 508,559

[22] Filed: Apr. 13, 1990

[51] Int. Cl.$^5$ ............................................. B01D 46/04
[52] U.S. Cl. .......................................... 55/21; 55/96; 55/273; 55/300; 55/304; 55/521; 15/352
[58] Field of Search .................... 55/21, 96, 213, 273, 55/300, 304, 497, 521; 15/347, 352

[56] References Cited

U.S. PATENT DOCUMENTS

| | | | |
|---|---|---|---|
| 4,258,451 | 3/1981 | Sommerfeld | 15/352 |
| 4,465,497 | 8/1984 | Howeth | 55/273 |
| 4,557,739 | 12/1985 | Fortman et al. | 55/320 |
| 4,637,825 | 1/1987 | Howeth | 55/302 |
| 4,650,504 | 3/1987 | Howeth | 55/302 |
| 4,661,131 | 4/1987 | Howeth | 55/302 |
| 4,704,144 | 11/1987 | LeBlanc et al. | 55/300 |
| 4,756,727 | 7/1988 | Howeth | 55/302 |
| 4,786,295 | 11/1988 | Newman et al. | 55/213 |
| 4,787,923 | 11/1988 | Fleigle et al. | 55/304 |

OTHER PUBLICATIONS

Bulletin "Silo Filter Vents", PD Inc.
Bulletin "Buffalo Aeroturn Shaking Bag Dust Collector/Type S" AP-950, Buffalo Forge Company.
American Lincoln 3300 Rider Sweeper.
Clarke-American 3000 Rider Sweeper.

*Primary Examiner*—Charles Hart
*Attorney, Agent, or Firm*—Kinzer, Plyer, Dorn, McEachran & Jambor

[57] ABSTRACT

A powered surface maintenance machine having an exhaust air system for dust control is equipped with air filters for removing dust from the air before exhausting it to atmosphere. Automatic means are provided to mechanically shake dust from the filters whenever enough has accumulated on them to adversely affect dust control. This filter cleaning is accomplished with no attention from the machine operator and does not interrupt the operation of the machine or the air flow needed for dust control.

20 Claims, 6 Drawing Sheets

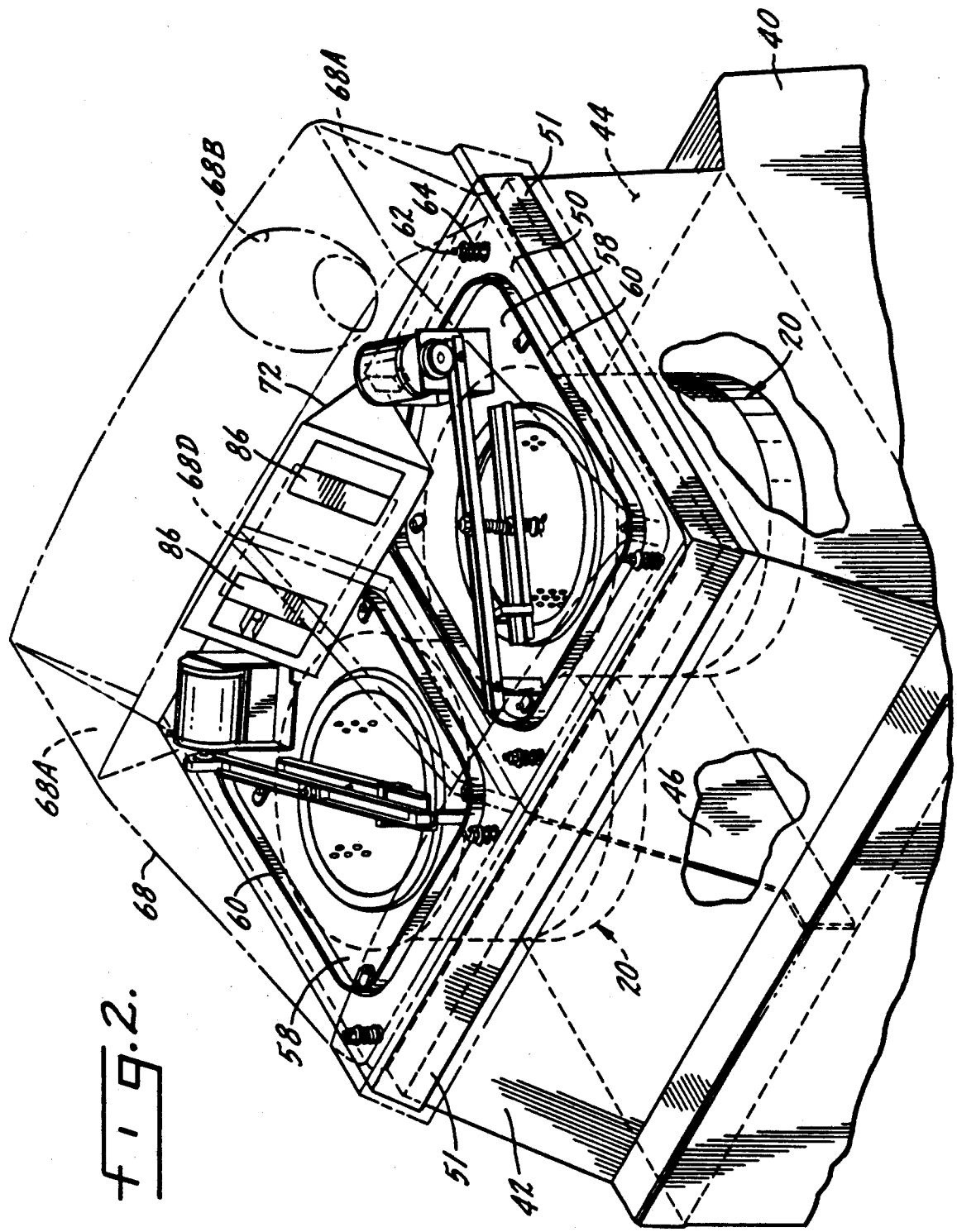

UNATTENDED AIR CLEANING SYSTEM FOR SURFACE MAINTENANCE MACHINE

BACKGROUND OF THE INVENTION

Over the years various kinds of machines have been developed for cleaning and maintaining floors inside buildings, and paved outdoor areas such as streets, sidewalks and parking lots. They include such machines as rotary broom sweepers, vacuum sweepers, scarifiers, burnishers, polishers and scrubbers. For our purposes here they can be divided into machines which apply water to the surface being maintained and machines which operate dry. We are concerned with the latter, which would include many vacuum sweepers, scarifiers, and rotary broom sweepers. They all share one problem which is addressed by this invention. In their normal operation they tend to stir up dust from the surface being maintained. If it is not controlled, this dust will settle on everything and everybody in the vicinity of the machine, and that is highly objectionable.

On many of these machines the problem has received one general solution. The functional tool which generates the dust, such as a rotary broom, a scarifier head, or a vacuum pickup, is provided with a cover and surrounded by walls which have rubber skirts that hang down almost to the surface being maintained. An on board exhaust blower continuously pulls air from the tool chamber thus created so there is a sub-atmospheric air pressure within it which eliminates outflow of dusty air from under the skirts. The blower exhausts this air to atmosphere. One or more air filters are placed in this air path, either upstream or downstream from the blower, to remove dust from the air before it is released so the discharge to atmosphere will be dust free.

The dust thus removed from the air stream builds up on the filters and in time will block off the airflow through them unless they are periodically cleaned, so a cleaning means is commonly provided which the machine operator must use when needed. Generally the operator must be watchful for dust coming out from under the skirts, which indicates that airflow has been reduced by dust plugging the filters. He or she then must stop the machine, shut off the air flow, and activate the cleaning means. This is most commonly a mechanism that shakes or jolts the filters for a predetermined time to shake off the dust, which falls to a collection tray for later removal. Then the air flow is restarted and the machine operation is resumed. This method is effective when properly carried out, but it takes time away from productive operation. Some operators carelessly neglect doing it when needed, so that dust escapes from the machine while it is operating and settles on objects in the area. Also, filters that are allowed to get too dirty cannot be as effectively cleaned and must be replaced more often than properly serviced filters.

To eliminate these shortcomings it would be desirable to provide an automatic filter cleaning system that would require no attention from the operator and that would function without interrupting the machine operation. There have been efforts in that direction. U.S. Pat. Nos. 4,637,825 and 4,756,727 each show a sweeper filter that is automatically cleaned while the sweeper is operating by directing pulses of compressed air sequentially against segments of the filter from its clean side to blow off dust.

It is common in industry to clean air filters by thus back blasting them with pulses of compressed air. Many industrial machines generate dust, for example, cement mills. Exhaust fans are used to suck the dust into bag houses which contain multiple filters to clean the exhaust air before releasing it to atmosphere. The bag house filters are commonly cleaned by sequentially back blasting them with pulses of compressed air that is obtained from an air compressor on the grounds.

A typical industrial plant needs compressed air for many uses, so the cost of the compressor does not have to be charged entirely to the bag house. Using a back blast system on a surface maintenance machine such as, for example, a sweeper or scarifier, however, requires adding an on board air compressor, an air tank and related valving not otherwise needed. This adds substantial first cost and some maintenance cost to the machine and increases the fuel consumption of its engine, which must pick up the added load of driving the compressor. Also, care must be taken that the pulses of compressed air do not create puffs of dust out from under the skirts.

There are also industrial bag houses in which the bags are cleaned by mechanically shaking them. In these the air flow through them is shut off while the bags are being cleaned. If continuous operation is necessary the bags are installed in a series of compartments so that air can be shut off from one compartment at a time and those bags shaken while the remaining compartments continue to pass air. All the compartments will be cleaned sequentially, one at a time. This cleaning cycle may be set up to operate automatically, triggered by a pressure build-up across the filters. However, this technology has never been applied to mobile surface maintenance machines such as sweepers, vacuum cleaners, scarifiers and the like. The inventors of the present invention were the first to recognize the possibility of doing this and develop a practical way of doing it on mobile equipment of this type.

SUMMARY OF THE INVENTION

The present invention overcomes the shortcomings of the prior art. It provides a fully automatic filter cleaning system for a mobile surface maintenance machine which does not require any attention on the part of the machine operator and does not require stopping the machine operation to clean the filters. Adequate air flow for effective dust control is maintained a all times, including while the filters are being cleaned.

Two or more filters are provided, with the exhaust air flow divided between them. As dust accumulates on the filters they offer increasing resistance to the air flow, which results in increasing differential air pressure across them. This is sensed by a differential pressure switch which initiates a cleaning cycle when a predetermined differential pressure level is reached. This level is set low enough to assure adequate dust control for the machine and long life for the filters. At the same time it does not subject the cleaning apparatus or the filters to the wear and tear of continuous cleaning cycles. It is responsive to the work environment, cleaning more often in very dirty conditions and less often in cleaner places.

The cleaning cycle consists of several steps. First the air flow is shut off to one filter by an air valve which blocks the air passageway between that filter and the exhaust blower. Meanwhile air continues to pass through the other filter or filters. There may be any desired number of filters, but it has been found in practice that a minimum of two will suffice, so two will be used by way of example in this discussion. If more than two are used, then each one will be blocked off and cleaned in sequence while the remainder continue to pass air. A mechanical device then repeatedly hammers on the filter that is not passing air, knocking off the dust on it, which falls into a collection tray. After a predetermined time this action stops and air flow is readmitted by the air valve to the now clean filter. Air to the other filter is then shut off by the air valve, it is cleaned in the same way as the first one, and air is then readmitted to it by the valve so that normal airflow through both filters is resumed. The entire cleaning cycle operates automatically, with no attention from the operator, and during the cycle, when air is shut off from one filter, the remaining filter passes the air stream, so that dust control for the machine is always provided and operation is not interrupted. The mechanical filter cleaners are well proven devices, and are substantially lower in cost than the equipment needed to clean filters with back blasted air.

A preferred form of the invention utilizes two cylindrical pleated media filters. However, the invention will accommodate air filters of other types. An alternative design is described utilizing two flat panel pleated media filters, and other known types of air filters may also be successfully employed. These might include, for example, cloth filters formed into bags, envelopes or socks, which are well known types of filters in the field of air filtration.

A conventional forward throw rotary broom sweeper will be used by way of example in the following description of the invention. However, it should be understood that, as already stated, the invention could as well be applied to other types of mobile surface maintenance machines, such as, for example, other types of rotary broom sweepers and other machines such as scarifiers and various types of vacuum sweepers.

BRIEF DESCRIPTION OF THE DRAWINGS

FIG. 2 is a perspective view of the front of a sweeper with the hood in phantom lines to show the arrangement of the filters and the filter cleaning system under the hood

DETAILED DESCRIPTION OF THE INVENTION

Figure 1:
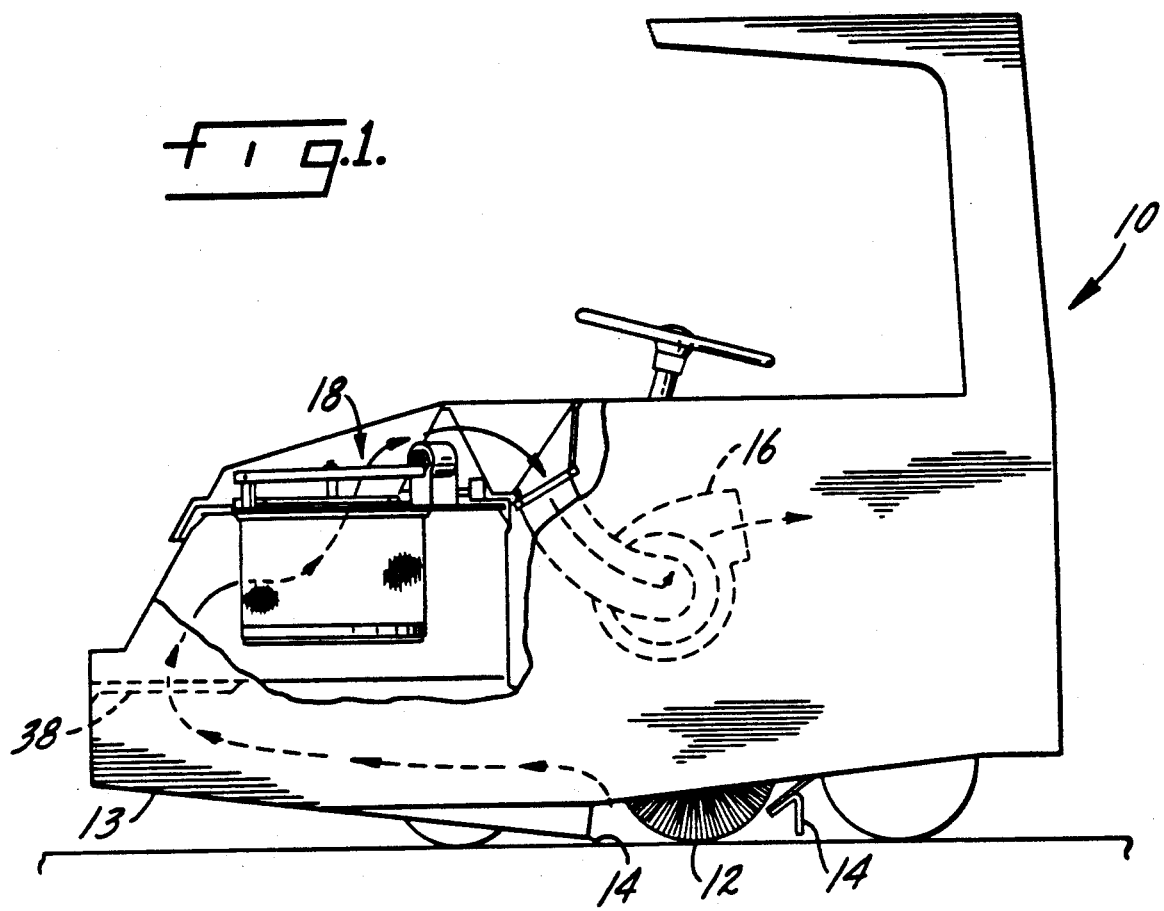
FIG. 1 is a side view of a sweeper broken out to show the general arrangement of the air filters.

With reference to FIG. 1, there is shown a typical industrial sweeper 10. As shown, it is a conventional forward throw sweeper. However, it could as well be an over-the-top, rear hopper sweeper, a type which is also well known in the art. It has a rotating broom 12 for sweeping debris from a floor or other surface into a debris hopper 13. The broom chamber is enclosed on all sides by skirts which come down nearly to the floor. A front skirt and a rear skirt are indicated as 14, and two more, not shown, enclose the ends of the broom chamber. These largely contain within the broom chamber any dust stirred up by the broom. To complete the dust control there is a suction blower 16 which exhausts air from the broom chamber to atmosphere in an airflow path shown by the arrows in FIG. 1. This maintains a sub-atmospheric pressure within the broom chamber so that air is drawn in under the skirts rather than flowing out. Thus no dust escapes from around the broom. There is an air filter and filter cleaning system shown generally at 18 in FIG. 1 and in greater detail in other figures. This system removes the dust from the air stream so the blower will exhaust clean air to atmosphere.

As shown, the airflow passes first through the filters and then through the blower. This is a preferred arrangement because the air is cleaned before it passes through the blower, which reduces abrasive wear on the blower. However, some sweepers pass the air first through the blower and then through the filters. This arrangement can also be accommodated by the invention.

FIG. 2 is a front perspective view showing the general disposition of the air filters and the filter cleaning system within the industrial machine. FIG. 2 is provided to assist in visualizing the overall arrangement of the filters and filter cleaning system.

Figure 3:
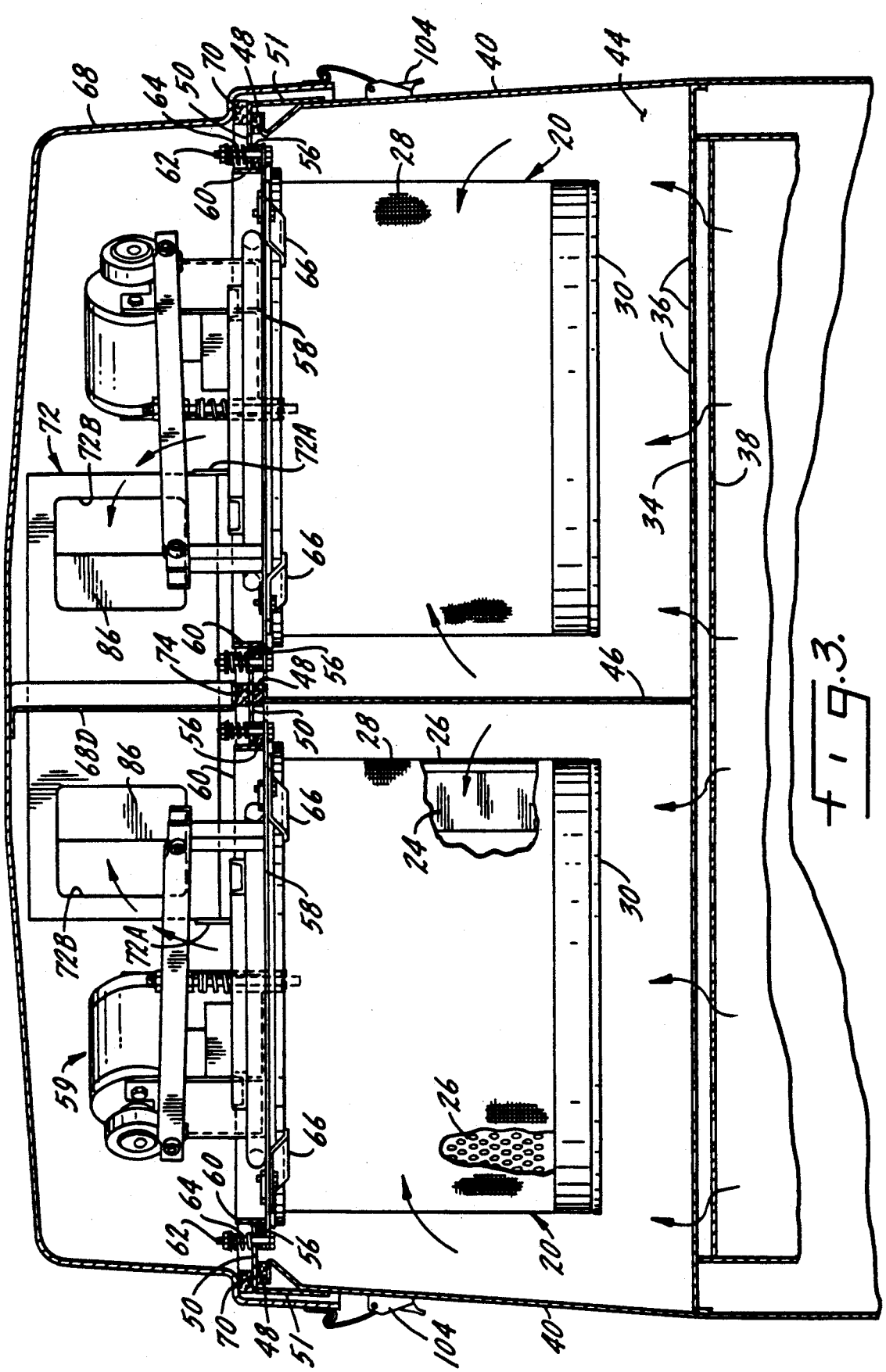
FIG. 3 is a front view, partially in section, showing the filters, the filter cleaning mechanisms and the divided plenum under the hood.

There may be two identical air filter assemblies 20, best shown in FIG. 3. These are commercially available cylindrical pleated media filters, such as are manufactured, for example, by Donaldson Company, Inc. of Minneapolis, Minnesota. They have a pleated media, with the pleats running parallel to the centerline of the cylinder, which makes them vertical when installed as shown. In each filter the media is surrounded with a perforated metal sleeve 26 for structural integrity. Outside the metal sleeve 26 is a fine mesh sleeve 28 woven from a slippery synthetic filament which stops the coarser dust and sheds it easily during a filter cleaning cycle. There is a closure 30 across the bottom of each filter which may open somewhat during a filter cleaning cycle to release accumulated dust. The upper end of each filter is open. The detailed construction of these filters and the mechanisms to clean them is described and illustrated in U.S. Pat. No. 4,704,144 to LeBlanc et al. This patent is incorporated herein by reference, so a detailed description of the filters and filter shakers will be omitted here.

Figure 4:
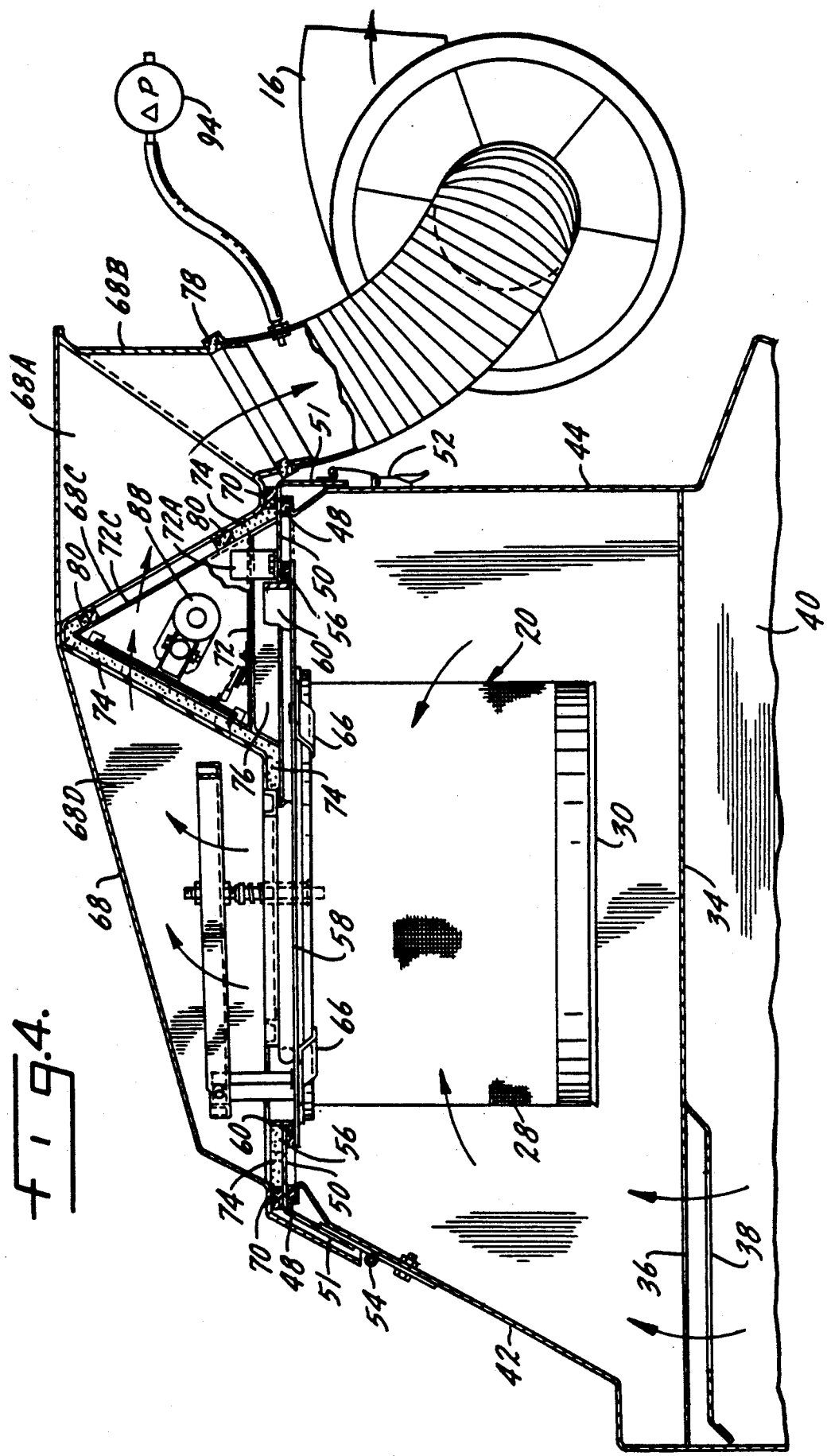
FIG. 4 is a side view, partially in section, of the filter and filter cleaning system, with certain parts broken away or omitted for clarity.

Part of the sweeper structure comprises a box-like sheet metal structure known as a filter box to house the filters. As shown in FIGS. 3 and 4, it has a floor 34, which extends across the width of the sweeper body. This floor has a series of slotted holes 36 in it near the front of the machine to admit air into the filter area, as shown by the airflow arrows in FIGS. 1, 3 and 4. In conjunction with these slots there may optionally be a slotted baffle plate 38, see FIGS. 3 and 4, the two slotted plates together forming a pre-cleaner which may be according to the teaching of U.S. Pat. No. 4,557,739. The filter box also has two side walls 40, which may be the side walls of the sweeper body. It has a front wall 42 and a rear wall 44. A center dividing wall 46 divides the filter box into two compartments. All of these walls including the center divider are of the same height and all have horizontal flanges at their upper edges so that the top of the box effectively has a continuous horizontal flange all around it and along its center divider. On top of this flange all the way around the box and along its center divider there is a continuous soft rubber gasket 48.

Resting on top of gasket 48 is a flat steel cover plate 50 which is large enough to cover the entire filter box. Plate 50 is bent down on all four sides, as at 51, to stiffen it, as shown in FIGS. 3 and 4. It is secured to the filter box by two hinges 54 at the front and two latches 52 at the rear. Plate 50 has two large, generally rectangular holes in it corresponding to the locations of the two filters. Adjacent to and surrounding these holes on the underside of the plate are two thick, soft, compressible rubber gaskets 56 which may be cemented to plate 50.

Directly beneath gaskets 56 are two rectangular flat steel plates 58. Each of these has a circular hole in its central area approximately the same size as the interior diameter of the filters. Each plate 58 also has a steel strip 60 formed into a generally rectangular shape and edge welded to the upper surface of the plate 58 to stiffen it and keep it from warping. These strips are best seen in FIG. 2. They extend above the cover plate 50, and the large, generally rectangular holes in plate 50 are sized to provide clearance for them.

Each plate 58 is held up against a gasket 56 and the plate 50 by four bolts 62 near the corners of each plate 58. These bolts pass upward through plates 58 and plate 50. Each bolt has a compression spring 64 around it above plate 50, with a flat washer and a lock nut above the spring to complete the attachment. The lock nuts can be tightened down until the springs 64 and the gaskets 56 are compressed enough to hold the plates 58 in sealing contact with the gaskets 56. These provide resilient mountings for the plates 58, which are important to the successful cleaning of the filters.

Each of the filters 20 has a flange and a face gasket around its open upper end. The filters are firmly held up in sealing contact with the plates 58 by four clamps 66 around each filter which bear against the flanges.

Above each filter there is a shaker mechanism for shaking or jolting that filter during the cleaning cycle. The construction and operation of these shaker mechanisms are fully described in U.S. Pat. No. 4,704,144, which has been previously referenced. This patent describes how dust accumulated on a filter during service is shaken loose by the shaker mechanism and emptied out the bottom of the filter during a cleaning cycle, so that description will not be repeated here.

Above the shaker mechanisms there is a hood 68. It may be made from sheet steel, but preferably is molded from a plastic material such as ABS. It rests on a gasket 70 which is cemented to the top surface of plate 50 all the way around near the edge of the flat surface of the plate. Alternatively, gasket 70 could be cemented to the hood 68. The hood is drawn down firmly against the gasket by latches 104 mounted on the side panels 40 (FIG. 3). This hood covers and encloses the entire area of the filters and shakers, and seals it from outside air. It may be removed to inspect or service the filter area by releasing the latches 104 and lifting it off.

The hood 68 also serves two additional functions. First, a plenum chamber 68A (FIGS. 2 and 4) extends the full width of the hood and is an integral part of it. The plenum chamber is formed of sheet plastic and is bonded to the main part of the hood, which closes its otherwise open top and ends. Plenum chamber 68A has one outlet opening 68B which communicates with exhaust blower 16, and two inlet openings 68C (one shown in FIG. 4) which communicate with valve box 72. Gasket 78 seals around the outlet opening while two gaskets 80 cemented to the valve box seal around the plenum inlet openings. This plenum chamber thus provides part of the air passageway from the filters to the exhaust blower; specifically it connects the valve box 72 to the blower inlet duct.

Secondly, the hood 68 also has a central longitudinal bulkhead 68D as an integral part. This bulkhead and the plenum chamber 68A seal against a continuous central strip gasket 74 which is cemented to cover plate 50 and valve box 72 and which butts at its ends against gasket 70.

Valve box 72 is a sheet metal structure, triangular in cross section and completely closed on all sides except for two outlet openings 72C on the side toward plenum chamber 68A and two inlet openings 72B on the side toward the filters. Its bottom and two ends are formed in one piece, with flanges to which the sides are screwed. It has two angle brackets 72A welded to its ends, by means of which it is bolted to cover plate 50.

Under the center of the valve box there is a longitudinal bulkhead 76 which is welded to plate 50. The valve box is bolted to it also. This bulkhead completes the separation of two sealed air chambers under the hood 68 and above the filters 20.

The only outlet from each chamber is through one of the two inlet openings into valve box 72, and the only inlet is through the central hole in one of the flat plates 58. Each of the filters thus communicates with one of these chambers.

Figure 5:
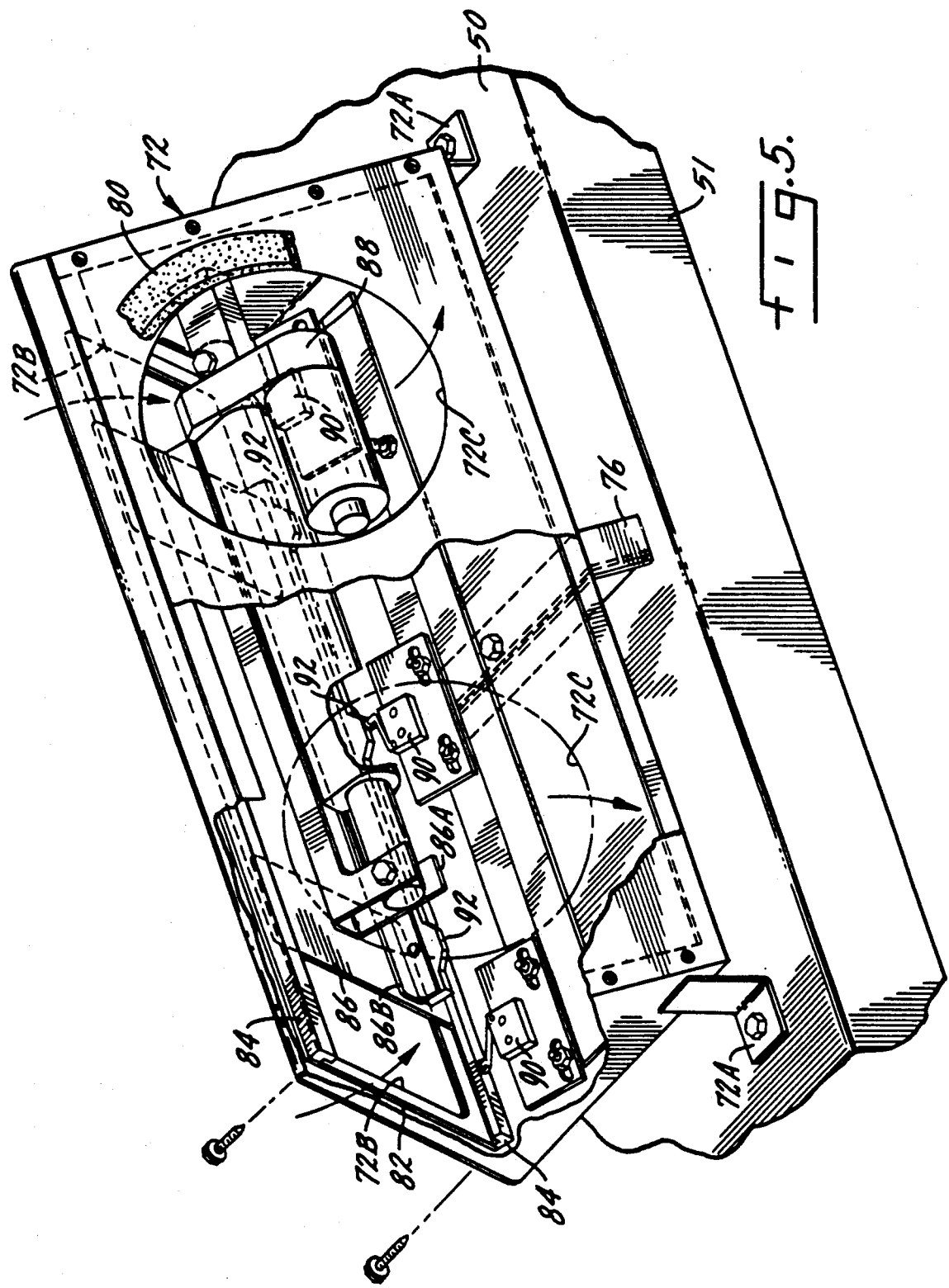
FIG. 5 is a rear perspective view of the air valve chamber, showing slide valves, actuator and limit switches.

The valve box 72 and the parts inside it are best shown in FIG. 5, which is a perspective view looking at the outlet side of the box. On the far side (the inlet side) there are two rectangular openings 72B, also shown in FIG. 3. One of these openings communicates with each of the two chambers discussed above. There is a wear plate 82 and two slide tracks 84 made of Delrin ™ plastic attached to the inlet side of the box with sheet metal screws. The wear plate has two openings in it which correspond to the inlet openings 72B. There is a sheet steel slide plate 86 which slides in the slide tracks. Spot welded to the slide plate are a channel 86A and an angle 86B. An electric actuator 88 is anchored to one end of the valve box and has its extendable rod connected to the channel 86A. The actuator can thus drive the slide plate back and forth along the tracks 84 and cause it to cover one or the other of the two inlet openings. When one opening is covered the other will be fully open. An intermediate position of the actuator will locate the slide plate so that it half covers and half exposes both inlet openings. This is the position illustrated in FIGS. 3 and 5. It is thus possible to selectively admit air into the valve box from one or the other or both of the inlet openings.

The three actuator positions corresponding to these three conditions are sensed by three actuator position sensors or limit switches 90 which are adjustably attached to the valve box floor. These in turn are actuated by three cam lobes 92 which are attached to the slide plate 86 by means of the angle 86B.

A pressure switch for sub-atmospheric pressure, shown schematically in FIG. 4 as 94, is installed near the filter box, with one of its pressure ports connected to the duct leading to the exhaust blower 16 and its other pressure port open to atmosphere. It will thus be affected by the differential pressure across the filters, which is a measure of how plugged up they may be. In normal service, as dust gradually accumulates on the filters, the differential pressure will rise. When it reaches a predetermined value the pressure switch will close, which will initiate an automatic filter cleaning cycle.

Figure 6:
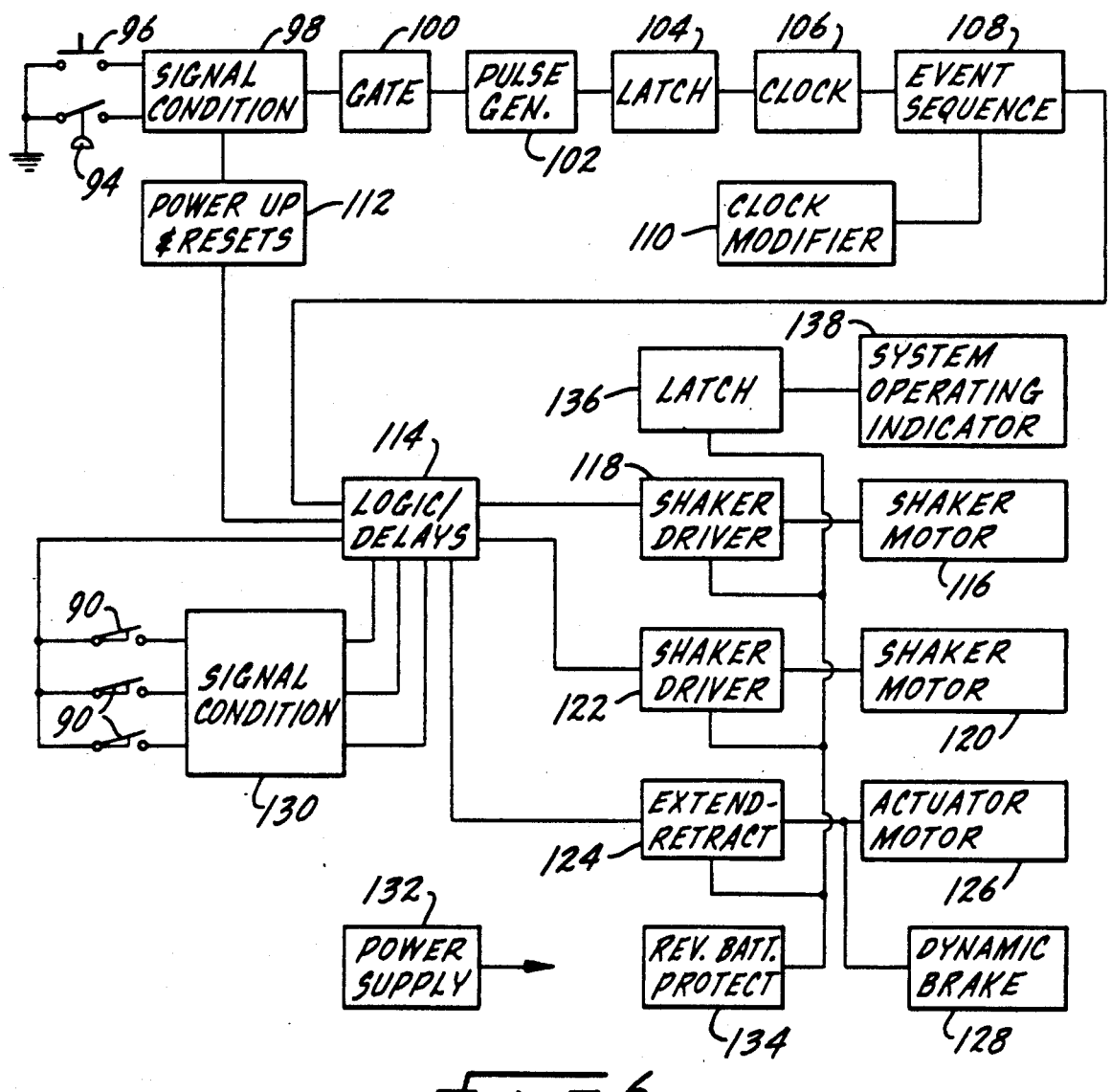
FIG. 6 is a block diagram of the electronic control system.

FIG. 6 shows in block diagram form the electrical circuitry used to actuate and control the automatic cleaning cycle. The cycle is initiated automatically when the pressure switch 94 closes due to dust build-up on the filters, or it can be initiated manually by the operator with a push button switch 96 on the dashboard of the sweeper. At 98 an R-C network and a Schmitt trigger clean the signal of spikes and noise, after which it passes through gate 100 to pulse generator 102. Here an oscillator generates a square wave of about 1000 Hertz. The rising edge of the first wave closes the latch 104, which locks in the signal and disables gate 100. From then on the cycle will proceed to its conclusion whether switches 94 and 96 stay closed or not. The clock 106 outputs a pulse every 15 seconds that triggers the event sequencer 108. The clock modifier 110 makes the first pulse duration the same as all following pulses. As these pulses are received by the event sequencer it will send successive signals to the logic/delays circuit 114 instructing it to activate in proper sequence the events needed for a filter cleaning cycle. It will also enable latch 136 to turn on LED 138 on the dashboard of the sweeper and hold it on for the duration of the cleaning cycle to indicate to the operator that a cleaning cycle is in progress.

At 112 a brief delay is introduced to assure that the signal is clean and that all devices are reset, than power is fed to the logic/delays 114. This circuit also has inputs from the actuator position sensors or limit switches 90 and the event sequencer 108. When it receives a signal from the event sequencer it activates the events that are required to provide a cleaning cycle for the filters. These events in order are: 1) Interrogate the actuator position sensors 90 to ascertain the position of the actuator 88 and send it to midpoint position if it is not already there. This and all other actuator movements are accomplished by appropriate signals sent to solid state bidirectional switch 124, through which the actuator motor 126 will be driven in the appropriate direction. At the end of any actuator movement a dynamic brake 128 is applied to quickly stop the actuator motor, with minimum coast down. 2) Move the actuator to one end of its stroke, thereby sliding the slide plate 86 across one inlet opening of the valve box, and shutting off air flow through the filter associated with that inlet opening. Completion of this and any other actuator movement will be signalled by the appropriate actuator position sensor 90, which will close when the desired actuator position is achieved and send a signal to the logic/delays 114 through signal condition 130. 3) Operate for 30 seconds, or two counts of the clock 106, the shaker motor for the filter drawing no air. Shut off the motor and delay for two seconds while the motor speed runs down. This shaker motor is indicated in FIG. 6 as number 116, and its associated solid state driver is number 118. 4) Move the actuator to the other end of its stroke, thereby causing the slide plate to open the air passage to the filter just shaken and close the air passage to the other filter. 5) Operate the shaker motor associated with this other filter for 30 seconds, thereby cleaning it. Shut off the shaker motor and pause for two seconds. This shaker motor is shown in FIG. 6 as number 120, and its associated solid state driver is number 122. 6) Return actuator to midpoint position. 7) Check to see if the differential pressure switch is closed. If yes, repeat the cycle. If no, reset all components to original conditions. The system is now in condition for normal sweeping, drawing air through both filters, and waiting for the next command to initiate a cleaning cycle.

The control circuitry shown in FIG. 6 is completed with a suitable power supply, shown generally as 132, and a reverse battery protect 134. The latter circuit acts to block all current from the control circuitry and power circuits in the event that the sweeper battery is inadvertently connected backward.

ALTERNATIVE EMBODIMENTS

Figure 7:
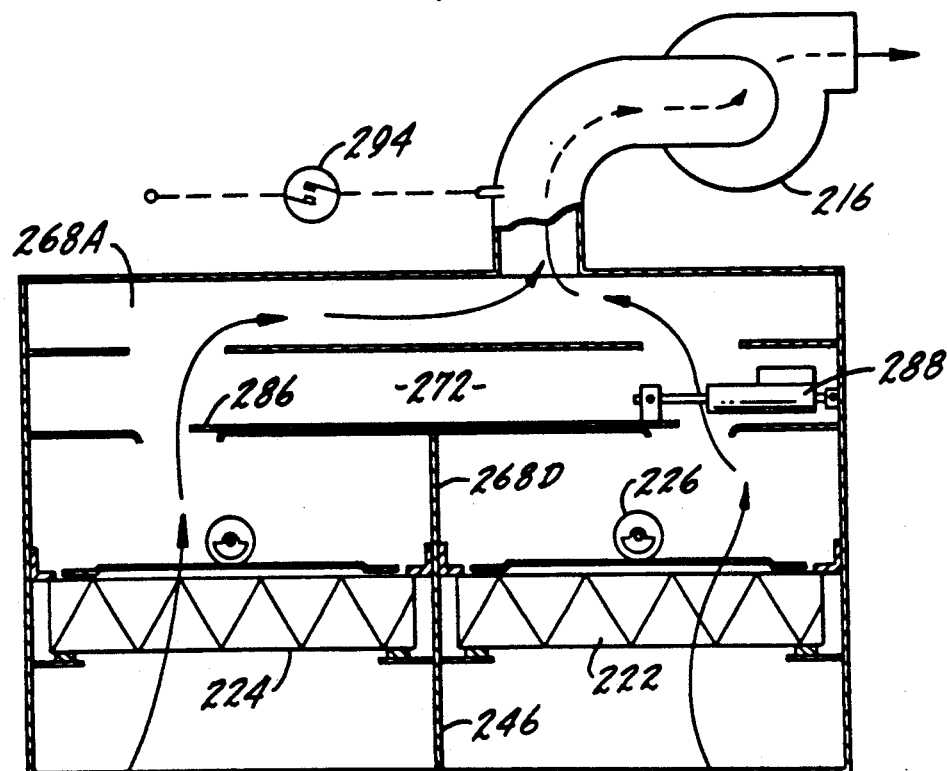
FIG. 7 is a schematic diagram showing an alternative construction using flat panel pleated media filters.

FIG. 7 shows a schematic representation of another form of the invention. The prior embodiment utilizes two cylindrical filters, but it is also possible and entirely practical to use two flat panel filters. Cylindrical filters permit somewhat more filter area to be installed in a sweeper of a given size. For many applications this additional filter area is not necessary. Indeed, flat panel filters are very commonly used in sweepers of the type considered in this application. Flat panel filters are indicated in FIG. 7 as 222 and 224. These can have shaker mechanisms to clean them indicated generally as 226. U.S. Pat. Nos. 4,258,451 and 4,787,923 show suitable mountings and shaker mechanisms for a flat panel filter used in a sweeper, and are incorporated here by reference. These patents show only one flat panel filter per sweeper, but the present invention would require two or more, just as two or more cylindrical filters were required in the preferred embodiment. In FIG. 7 the space below the filters is separated by bulkhead 246. The space between and above the filters is separated by bulkhead 268D. There is a valve box 272 having two inlet openings and two outlet openings. It contains a valve plate 286 and an actuator 288. The actuator position would be controlled with cam lobes (not shown in FIG. 7) as in the prior embodiment. Beyond the valve box would be a plenum chamber 268A to direct airflow from the valve box to the exhaust blower 216. A pressure switch 294 connected between the blower inlet duct and atmosphere would monitor the differential pressure across the filters and automatically initiate a cleaning cycle when needed, which would be the same as for the cylindrical filters. All of this is comparable to the prior embodiment, and represents only a variation well within the intent of this patent.

Various means for initiating a cleaning cycle can be envisioned, also. As a cost reduction the pressure switch 94 might be eliminated, leaving only the manual pushbutton 96 (FIG. 6). All other features of the system would be retained. In this configuration the operator would still have to watch for signs of dirty filters, such as dust starting to come out from under the brush skirts. At that point he or she could push the pushbutton and the cleaning cycle would proceed t its completion. This would retain the advantage of cleaning the filters without interrupting the sweeping operation and without shutting off the dust control air flow, and it would simplify the operator's job.

It would also be possible to replace the pressure switch 94 with a timer, while retaining all other features of the system as described. The cleaning cycle would be activated by the timer at predetermined time intervals This would provide filter cleaning with no attention from the operator and without interrupting sweeping or dust control. However, it would not be as responsive to operating conditions as the pressure switch is.

Whereas the preferred form and several variations of the invention have been shown, described and/or suggested, it should be understood that suitable additional modifications, changes, substitutions and alterations of the invention may be made without departing from the invention's fundamental theme.

The embodiments of the invention in which an exclusive property or privilege is claimed are defined as follows:

1. An unattended air cleaning system for use in a powered mobile surface maintenance machine having an air exhaust system for dust control, said unattended air cleaning system comprising:
   a minimum of two air filters in the air exhaust system arranged such that part of the air stream normally flows through each filter,
   valve means to selectively isolate each of the filters one at a time from the air stream, said valve means also being capable of readmitting airflow through each filter, means to shake or jolt each of the filters individually to remove accumulated dust from it,
   means to sense the differential air pressure across at least one of the filters to determine when it is at a predetermined level,
   control means to initiate and carry out an unattended filter cleaning cycle when the predetermined level of differential air pressure is determined,
   said filter cleaning cycle comprising:
   isolating a first filter from the air stream, then
   shaking or jolting said first filter for a predetermined period of time, thereby cleaning it, while it is isolated from the air stream, meanwhile allowing the air stream to flow through the balance of the filters,
   subsequently readmitting airflow through the first filter, and
   subsequently dealing in the same way with each of the other filters in turn until all have been cleaned.

2. The unattended air cleaning system of claim 1 in which the means to sense differential air pressure is replaced by a timing means, and the control means initiate and carry out the unattended filter cleaning cycle in response to a signal from the timing means.

3. The unattended air cleaning system of claim 1 in which the air filters are cylindrical pleated media filters.

4. The unattended air cleaning system of claim 1 in which the air filters are flat panel pleated media filters.

5. An unattended air cleaning system for use in a powered mobile surface maintenance machine having an air exhaust system for dust control, said unattended air cleaning system comprising:
   a minimum of two air filters in the air exhaust system arranged such that part of the air stream normally flows through each filter,
   valve means to selectively isolate each of the filters one at a time from the air stream, said valve means also being capable of readmitting airflow through each filter, means to shake or jolt each of the filters individually to remove accumulated dust from it,
   manual means to initiate a filter cleaning cycle,
   control means to automatically carry out a filter cleaning cycle after the manual means has initiated it,
   said filter cleaning cycle comprising:
   isolating a first filter from the air stream, then
   shaking or jolting said first filter for a predetermined period of time, thereby cleaning it, while it is isolated from the air stream, meanwhile allowing the air stream to flow through the balance of the filters,
   subsequently readmitting airflow through the first filter, and
   subsequently dealing in the same way with each of the other filters in turn until all have been cleaned.

6. A method of dust control on a mobile surface maintenance machine while it is in motion and operating, the machine having an air exhaust system which includes an air filter for removing dust from an air stream and an exhaust fan on the machine for moving an air stream carrying dust through the air filter, including the steps of dividing the air filter into at least two air filter units so that they are arranged to be operated in parallel in the exhaust system, using all of the air filter units in the exhaust system, from time to time isolating each of the air filter units from the air stream, mechanically shaking each air filter unit for a predetermined period to remove dust accumulated on it while it is so isolated and, at the same time, passing all of the air in the air stream through the remaining air filter units, returning each air filter unit to full operation after it has been isolated and shaken, and performing all of the above steps while the mobile surface maintenance machine is in full operation.

7. The method of claim 6 further characterized in that the steps of isolating and shaking the air filter units are initiated by sensing the increase in differential pressure across one or more of the air filter units caused by the accumulation of dust on the air filter units, and automatically initiating the isolating and shaking steps in response to a predetermined level of differential pressure across one or more of the air filter units.

8. The method of claim 6 further characterized by manually initiating the isolating and shaking steps.

9. The method of claim .6 further characterized in that the air filter is divided into two air filter units.

10. The method of claim 6 further characterized in that the steps of isolating and shaking are initiated in response to a timer.

11. The method of claim 6 further characterized by and including the step of shaping each of the air filter units into a generally cylindrical configuration.

12. The method of claim 6 further characterized by and including the step of shaping each of the air filter units into a generally flat panel.

13. In a filter system for a mobile sweeper, a mobile sweeper frame having a housing, a brush on the sweeper frame for sweeping debris from a floor, a debris hopper in the housing for receiving debris propelled by the brush, an air exhaust system in the housing for controlling dusting and constructed to remove air and dust from the area of the floor where sweeping is being performed, a filter system in the housing in the path of the air flow caused by the air exhaust system, two filter units in the filter system positioned in the housing above the debris hopper, walls in the housing separating the filter units into separate compartments, an upper opening from each filter unit through which air flows after passing through the filter units, an upper chamber above the filter units to receive clean air from the filter units, a lateral divider subdividing the upper chamber into two defined compartments, one in front and in direct communication with the filter units and the other behind and in direct communication with an exhaust, the said one compartment being divided by an intermediate longitudinal wall so that air flow from the filter units is kept separate, a valve structure in the divider and means for operating it so that one filter unit may be isolated while the other receives all of the air flow of the exhaust system, and mechanical means for selectively vibrating each of the filter units so that dust may be shaken from the isolated unit while the other filter unit is receiving the full air flow of the exhaust system.

14. The structure of claim 13 in which the sweeper is of the forward throw type.

15. The structure of claim 13 in which the filter units are supported by and depend from an intermediate wall which separates the upper clean air chamber from two lower dirty air chambers.

16. The structure of claim 15 in which the upper clean air chamber is defined at least in part by a hood which is removably mounted on the frame housing.

17. The structure of claim 16 further characterized in which the hood seals against the lateral divider.

18. The structure of-claim 13 in which communication is provided between the debris hopper and the filter system in the front of the housing.

19. The structure of claim 13 further characterized in that each of the filter units is cylindrical.

20. The structure of claim 13 further characterized in that the vibrating mechanism for each of the filter units is positioned in the front compartment.

* * * * *